Patented July 7, 1953

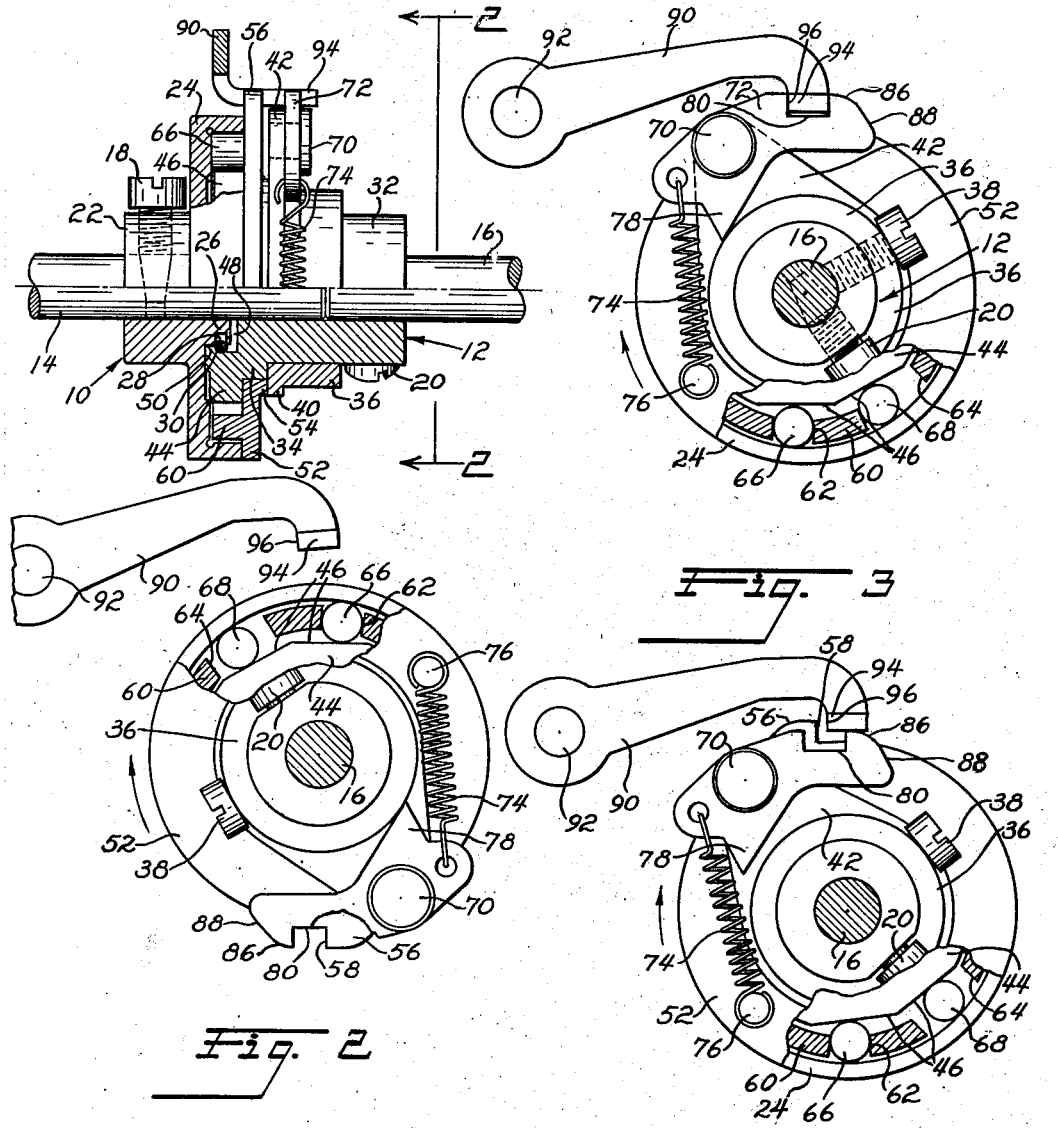

2,644,560

UNITED STATES PATENT OFFICE 2,644,560

LATCH OPERATED CLUTCH MECHANISM

Edward E. Kleinschmidt, Highland Park, Ill.

Application August 20, 1947, Serial No. 769,665

7 Claims. (Cl. 192—27)

This invention relates to clutch mechanism and particularly to roller clutches.

In previous clutches of this type, the engagement of the clutch rollers from their released position is somewhat variable, and, further, the driven member of the clutch assembly is free to rotate in a forward direction after the clutch rollers are engaged.

In certain types of mechanisms operating at high speeds, such as printing telegraph apparatus, it is essential that the driving and driven members be instantly locked for unitary rotation and remain locked without play or relative movement in either the forward or rearward direction during an operating cycle.

The general object and purpose of the present invention is to provide a clutch of the roller type having instantaneous and consistently uniform operation at high speeds of the clutch engaging and disengaging mechanism.

Another object is to provide a clutch mechanism of the roller type wherein, when the driving and driven members are connected they will be locked together without relative movement in both the forward and reverse directions.

A further object is to provide a clutch disengaging mechanism which will operate with a minimum of shock.

A still further object of the invention is to provide clutch mechanism as above characterized, in which the several cooperating parts are of rugged and durable structure form, insuring long life and maximum operating efficiency, and conducing to rapid, economical, low cost production.

With the above and other objects in view, the invention comprises the improved clutch mechanism and the construction and relative arrangement of its several parts, as will hereinafter be more fully described, illustrated in the accompanying drawings, and subsequently incorporated in the subjoined claims.

In the drawings, wherein I have disclosed one practical and satisfactory embodiment of the invention, and in which similar reference characters designate corresponding parts throughout the several views:

Figure 1 is a side elevation, the driving and driven members and clutch roller cage being partly shown in section;

Figure 2 is a sectional view taken substantially on the line 2—2 of Figure 1, with certain parts broken away and a portion of the clutch roller cage shown in section;

Figure 3 is a similar view, showing the disengageable control member disposed in coacting engagement with the pivoted pawl carried by the driven member; and Figure 4 is a view similar to Figure 3 but showing the final position of the control member after the driving connection between the driving and driven members has been released.

Referring in further detail to the drawings, in the example of the invention illustrated in Figure 1, the driving and driven members 10 and 12 are respectively rigidly fixed to shafts 14 and 16 by screws 18 and 20 respectively, or other equivalent means. The shaft 14 may be directly or indirectly connected with a motor or other source of power, while the shaft 16 may be connected to one of the machine parts for intermittent operation by the driven member 12.

The driving member 10 comprises a hub portion 22 secured on shaft 14, having at one end thereof an integrally formed, large diameter housing 24 for the clutch rollers, which is open at its outer side. Internally of said housing, a piloting extension 26 projects axially from the hub 22, and has a circumferential groove 28 in which an expansible split metal ring 30 is loosely positioned, and normally projects beyond the periphery of the pilot extension 26.

The driven member 12 also comprises an elongated hub 32. Shaft 16 is received in the outer end of the hub bore, while the end of shaft 14 projecting beyond the open side of housing 24, is adapted to be rotatably received within the inner end of the bore of hub 32. At its latter end, hub 32 is formed with a diametrically enlarged cylindrical portion 34 providing an abutment shoulder for one end of a collar 36 securely fixed to the hub 32 against rotation by the screws 38 or other suitable means. This end of collar 36 is formed with an outwardly projecting flange 40 provided with a radially projecting tapered arm 42 in the plane thereof, the purpose of which will be hereinafter explained. In axial succession to the shoulder 34, the hub 12 has its terminal portion formed with a flange 44 projecting radially outwardly from the shoulder 34. This flange is provided with a circumferential succession of flat peripheral faces 46. The flange 44 provides an internal cylindrical recess 48 in the end of the driven member 12, the circumferential wall of which, at the outer side of said recess, is formed with an annular lip 50 having a diameter less than the normal diameter of the split metal ring 30, and substantially equal to the diameter of the pilot extension 26 on the hub of driving member 10.

The roller cage member 52 comprises an annular plate having a flange 54 projecting laterally therefrom at its inner edge, which is seated upon the periphery of the part 34 of driven member 12 between the flange 44 and the flange 40 on the end of collar 36. This cage plate 52 has an outer diameter substantially equal to that of the housing 24, and closes the open side of said housing. On the periphery of this plate an outwardly projecting lug 56 is formed to provide a radially disposed stop shoulder 58.

In spaced relation from the outer edge of the cage plate 52, flange 60 projects laterally from the opposite side of said plate with respect to the flange 54, and is also outwardly spaced from the flange 44 on the end of the driven member 32. This flange is divided into a plurality of circumferentially spaced sections by slots 62 and 64 of relatively different lengths, alternating circumferentially of the cage member. The two sets of slots 62 and 64 are equal in number, and the total number of such slots equals the number of the flat peripheral faces 46 on flange 44 of the driven member 12. The slots 62 receive a set of driving clutch rollers 66 while the slots 64 receive a set of locking clutch rollers 68. The rollers in both sets are of equal diameters, and in the present instance I have shown four driving rollers 66 and four locking rollers 68. As these rollers individually coact with one of the flat surfaces 46 on flange 44, it will therefore be understood that this flange is provided with eight of the surfaces 46.

In the end of the arm 42 on collar 36, a stud 70 is suitably fixed upon which a pawl 72 is pivotally mounted. The pivoted end of this pawl is connected by a coil spring 74 to a stud 76 projecting from the outer side of the cage plate 52, said end of the pawl also being formed with an inwardly projecting nose 78 contacting the periphery of collar 36 and limiting pivotal movement of the pawl 72 in one direction to normal position by the spring 74.

The other end of pawl 72 is provided with a rectangular notch or recess 80 in the outer edge thereof. The adjacent convex edge face 86 merges into the obliquely inclined end surface 88 of the pawl to form a terminal camming lug on the pawl for the purpose to be presently explained.

As herein shown, the driving connection by the above described clutch assembly between driving and driven members 10 and 12 respectively, is releasably controlled by the arm 90 having a fixed connection at one end to a rock shaft 92, actuated by suitable means (not shown) in response to certain operating conditions of the apparatus in which the clutch mechanism is embodied. The other end of this arm is formed with a stop lug 94, angularly projecting from one side of the arm, in substantially parallel relation with the rock shaft 92. The width of the lug 94 is slightly less than the length of the slot 80 in pawl 72 in which said lug is adapted to be received.

In Figure 4 of the drawings the clutch mechanism is in release position with the rollers 66 and 68 out of contact with surfaces 46 and rotating freely in the rotation of shaft 14 and driving member 10 relative to shaft 16 and driven member 12. When control arm 90 is lifted from the position shown to dispose lug 94 thereof above the recess 80 in pawl 72 and out of contact with lug 56 on cage 52, spring 74 rotates the cage slightly relative to driven member 12 to instantly lock the rollers 66 between the opposed flat surfaces 46 on the driven member and the inner periphery of flange 24 on the driving member. Upon such driving engagement by the rollers 66, the other rollers 68, under the influence of centrifugal force, become tightly wedged between the other flat surfaces 46 of the driven member and the inner periphery of flange 24 on the driving member. Thus the two sets of clutch rollers will lock the driving and driven members against relative rotation in either direction, as shown in Figure 2 to transmit continuous rotation to shaft 16 at uniform speed from shaft 14.

When the control arm 90 is lowered to position lug 94 thereof in the path of the lug 56 on cage 52, pawl 72 is depressed against the resistance of spring 74, to approximately the position shown in Figure 3, by contact of cam surfaces 88 and 86 of the pawl with lug 94 of the control arm. The edge 58 of lug 56 then engages the inner edge of lug 94, arresting further rotation of the cage 52. As the rotation of driven member 12 continues until lug 94 is engaged in notch 80 of pawl 72 frictional contact of rollers 66 and 68 with the surfaces 46 of the driven member is released and said rollers assume the disengaged positions shown in Figure 4 of the drawing. It will thus be seen that the novel clutch mechanism provides means whereby the actuation of driven shaft 16 and parts connected therewith may be positively controlled as required to insure reliable and efficient operation of the particular mechanism or apparatus.

In the assembly of the several parts, preferably the cage member 52 and collar 36 are first assembled upon driven member 12, as above described. While holding or supporting member 12 in a vertical position, the rollers 66 and 68 are then arranged in the slots 62 and 64 of the cage flange, and the cylindrical wall of housing 24 on driving member 10 disposed in circumscribing relation thereto and said member axially moved towards the member 12. As the pilot extension 26 on member 10 enters recess 48 of member 12, the ring 30 contacting the annular lip 50 is constricted into groove 28. When a running clearance is established between the edge of the wall of housing 24 and cage member 52, the ring 30 expands behind the lip 50 and interconnects the driving and driven members with each other in coaxial alignment. The shafts 14 and 16 are then rigidly connected to the driving and driven members by means of screws 18 and 20 respectively.

From the above description and the accompanying drawings, it is believed that the construction, manner of operation and several advantages of the present invention will be clearly understood. It will be seen that I have provided a novel friction clutch mechanism with control means therefor which is operative to instantaneously and positively establish or disestablish the driving connection, and which also embodies means automatically operative when the driving connection is established to securely lock the driving and driven members against relative rotative movement in either direction. The two sets of friction clutch rollers 66 and 68 coacting with the adjacent angularly related surfaces 46 on the driven member, together with the novel assembly of the clutch roller cage 52 on said member, is a distinctive feature of the present invention. It has been found that a clutch mechanism of this kind will operate with great efficiency at high speeds in telegraph printing apparatus and similar mechanisms, where great exactness of operation of the different units is required, and for which the conventional type of roller clutch mechanism is not sufficiently sensitive in its response to operation of the automatic control means.

As herein disclosed, it will be evident that the present invention provides a highly compact arrangement of the several cooperating elements which are of rugged and durable structural form and can be rapidly produced with conventional manufacturing methods at comparatively low cost.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In clutch mechanism, coaxial driving and driven members, torque transmitting means comprising a roller clutch cage movable with and relative to said members about the axis thereof and two sets of clutch rollers between the driving and driven members, said cage having means restraining one set of rollers against movement circumferentially of the cage and said members and permitting relative circumferential movement of the other set of rollers, said driven member having a circumferential succession of flat peripheral faces respectively opposed to the individual rollers, in each set, said other set of rollers effectively engaging the driven member under the influence of centrifugal force to prevent reverse rotation thereof, and disengageable stop means to arrest rotation of the roller cage and driven member in successive order, whereby said first set of clutch rollers are disposed out of torque transmitting relation to the driven member and said other set of rollers move relative to the cage out of engagement with said driven member.

2. The combination defined in claim 1, together with means operative upon disengagement of said stop means to move said cage and said one set of rollers about said axis relative to said members and the other set of rollers, and establish torque transmitting contact between said one set of rollers and the opposed peripheral surfaces on the driven member.

3. In clutch mechanism, coaxial driving and driven members having radially opposed portions, said portion of the driven member having a circumferential series of flat peripheral surfaces, a cage mounted in concentric relation to said members for independent movement about the axis thereof, clutch elements movable with the cage and each coacting with certain of said flat surfaces on the driven member and the opposed portion of the driving member, means yieldably connecting said cage with the driven member and normally holding the clutch elements in torque transmitting relation with the driven member, means to releasably restrain the cage against movement with the driven member and retain said clutch elements out of torque transmitting contact with said surfaces of the driven member, and additional clutch elements respectively coacting with the driving member and other flat peripheral surfaces on said driven member under the influence of centrifugal force to lock said driven member against reverse rotation relative to the driving member.

4. In combination, coaxial driving and driven members, a friction clutch assembly mounted on said driven member including a cage and clutch elements positioned by the cage between radially opposed parts of the driving and driven members, means connecting said cage and driven member for unitary rotation in driving direction comprising an energy storing device, circumferentially spaced stop engaging parts carried by the cage and driven member, a disengageable stop successively coacting with said parts on said cage and driven member to stop rotation of the cage while permitting limited relative rotation of the driven member out of torque transmitting relation with the clutch elements, and to render said energy storing device effective, upon disengagement of the stop, to move the clutch assembly about the axis of said members and re-establish torque transmitting contact of said clutch elements with the driven member, and additional means interposed between the driving and driven members, automatically effective under the influence of centrifugal force to lock said driven member against reverse rotation relative to the driving member.

5. In clutch mechanism, coaxial driving and driven members, a friction clutch assembly including a cage mounted in concentric relation to said members for independent movement about the axis thereof, a first set of clutch elements movable with the cage between radially opposed portions of the driving and driven members, means yieldingly connecting said cage with the driven member and normally holding the clutch elements in torque transmitting relation with the driven member, means to releasably restrain the cage against movement with the driven member and retain said clutch elements out of torque transmitting contact with the driven member, and a second set of clutch elements interposed between the driving and driven members, automatically effective under the influence of centrifugal force to lock said driven member against reverse rotation relative to the driving member.

6. In combination, coaxial driving and driven members, a friction clutch assembly mounted on said driven member including a cage and clutch elements positioned by the cage between radially opposed parts of the driving and driven members, a disengageable stop, means connecting said cage and driven member for unitary rotation in driving direction including an energy storing device and a pawl pivotally mounted on said driven member connected at one end to said energy storing device and biased thereby to position its other end for effective engagement with said stop, a stop engaging part on said cage, said disengageable stop successively coacting with said part on the cage and with said pawl to stop rotation of the cage while permitting limited rotation of the driven member out of torque transmitting relation with the clutch elements, and to render said energy storing device effective upon disengagement of the stop to move the clutch assembly about the axis of said members and re-establish torque transmitting contact of said clutch elements with the driven member.

7. In combination, coaxial driving and driven members, a friction clutch assembly mounted on said driven member including a cage and clutch elements positioned by the cage between radially opposed parts of the driving and driven members, a disengageable stop, means connecting said cage and driven member for unitary rotation in driving direction including an energy storing device and a pawl pivotally mounted on said driven member connected at one end to said energy storing device and biased thereby to normal position, the other end of said pawl having a terminal cam portion to contact said stop and pivotally rock the pawl in one direction and an adjacent recess to receive said stop on the return of the pawl to normal position by said energy storing device, a stop engaging part on said cage, said disengageable stop successively coacting with said part on the cage and with said pawl to stop rotation of the cage while permitting limited rotation of the driven member out of torque transmitting relation with the clutch elements, and to render said energy storing device effective upon disengagement of the stop to move the clutch assembly about the axis of said members and reestablish torque transmitting contact of said clutch elements with the driven member.

EDWARD E. KLEINSCHMIDT.

References Cited in the file of this patent

UNITED STATES PATENTS

| Number | Name | Date |
| --- | --- | --- |
| 503,311 | Dahl | Aug. 15, 1893 |
| 1,256,755 | White | Feb. 19, 1918 |
| 1,426,398 | Lund | Aug. 22, 1922 |
| 1,976,791 | Ljungstrom | Oct. 16, 1934 |
| 2,158,192 | Meyer | May 16, 1939 |